United States Patent
Kamimura (10) Patent No.: US 7,738,042 B2
(45) Date of Patent: Jun. 15, 2010

(54) NOISE REDUCTION DEVICE FOR A VIDEO SIGNAL AND NOISE REDUCTION METHOD FOR A VIDEO SIGNAL

(75) Inventor: Shigeki Kamimura, Tsurugashima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/273,374

(22) Filed: Nov. 18, 2008

(65) Prior Publication Data

US 2009/0167952 A1 Jul. 2, 2009

(30) Foreign Application Priority Data

Dec. 26, 2007 (JP) .............................. 2007-333464

(51) Int. Cl.
H04N 5/14 (2006.01)
H04N 5/21 (2006.01)

(52) U.S. Cl. ...................... 348/607; 348/616; 348/701

(58) Field of Classification Search ................. 348/607, 348/618, 701, 241, 616, 620; 382/275, 260; 345/611

See application file for complete search history.

(56) References Cited

U.S. PATENT DOCUMENTS

| 4,651,211 | A | * | 3/1987 | Weckenbrock et al. ...... 348/702 |
| 4,656,514 | A | * | 4/1987 | Wilkinson et al. .......... 348/616 |
| 5,032,914 | A | * | 7/1991 | Fujita .......................... 348/702 |
| 5,311,306 | A | * | 5/1994 | Tanaka et al. ................ 348/702 |
| 5,786,872 | A | * | 7/1998 | Miyazaki et al. ............. 348/669 |
| 6,300,985 | B1 | * | 10/2001 | Lowe et al. .................. 348/665 |
| 6,999,130 | B2 | * | 2/2006 | Tanigawa ..................... 348/663 |
| 7,468,758 | B2 | * | 12/2008 | Chen .......................... 348/669 |
| 2004/0008777 | A1 | * | 1/2004 | Swartz .................. 375/240.12 |
| 2005/0168651 | A1 | * | 8/2005 | Morino ........................ 348/700 |

FOREIGN PATENT DOCUMENTS

| JP | 61-140684 | 8/1986 |
| JP | 63-090968 | 4/1988 |
| JP | 01-195793 | 8/1989 |
| JP | 04-2221740 | 12/1992 |

* cited by examiner

*Primary Examiner*—Victor Kostak
(74) *Attorney, Agent, or Firm*—Blakely, Sokoloff, Taylor & Zafman LLP (57) ABSTRACT

A noise reduction device for generating a delay frame by delaying an input frame in each frame, a first difference value between the delay frame and the input frame, a line delay frame by delaying the input frame in each line, and a second line delay frame by delaying the delay frame in each line. The device generates a second difference value between the input frame and the line delay frame, a third difference value between the delay frame and the second line delay frame, a fourth difference value between the line delay frame and the second line delay frame. The device corrects the input frame by using the first difference value based on a logical sum (or product) of the third difference value and the fourth difference value, and the delay frame based on a logical sum (or product) of the second difference value and the fourth difference value.

5 Claims, 4 Drawing Sheets

CURRENT FRAME CF    DELAY FRAME DF

NOISE REDUCTION DEVICE FOR A VIDEO SIGNAL AND NOISE REDUCTION METHOD FOR A VIDEO SIGNAL

CROSS-REFERENCE TO RELATED APPLICATIONS

This application is based upon and claims the benefit of priority from the prior Japanese Patent Application No. 2007-333464, filed on Dec. 26, 2007; the entire contents of which are incorporated herein by reference.

BACKGROUND

1. Field of the Invention

The present invention relates to a noise reduction device and a noise reduction method to remove noise generated in, for example, video information.

2. Description of the Related Art

As a noise reduction circuit reducing noise in video information, two techniques in cyclic and non-cyclic are known. Noise reduction effect of the cyclic noise reduction circuit is larger than that of the non-cyclic noise reduction circuit, and therefore, it is widely used in a video processing device such as a conventional TV (for example, JP-U61-140684(Japanese Utility Model Publication).

The cyclic noise reduction circuit reduces the noise by integrating the video information in a time axis direction. Accordingly, so-called a tailing phenomenon of video occurs on a moving video when the cyclic noise reduction circuit is used. A method, in which a motion detecting circuit is added, integration effect is decreased for a portion with a large motion among the video, and thereby, the tailing phenomenon of video is reduced, is therefore proposed. However, it is difficult to obtain enough noise reduction effect while suppressing the tailing phenomenon because there is an error in the motion detection process. In particular, in case of video information in which the tailing phenomenon is outstanding such as a high vision signal (HD signal) in high resolution, there is a problem in which the video in high resolution is blurred caused by the integration effect of the noise reduction when the noise reduction process is strongly performed.

DETAILED DESCRIPTION OF THE INVENTION

In a video signal (video information) in high resolution, it is often that the video is disturbed by fine noises unique to a digital signal. Besides, a tailing phenomenon occurs in a video with motion, and quality of the video is deteriorated when a noise reduction process using a conventional integration circuit is performed. It is possible to apply to the fine noises unique to the digital signal as stated above, by a noise reduction device and method according to an embodiment of the present invention.

Concretely, existence of noises is detected while considering a motion of pictures from frames to perform a noise removal, based on a frame of a video signal being an object to be processed (hereinafter, called as a "current frame"), a frame in which a frame preceding to the current frame is delayed by a frame unit (hereinafter, called as a "delay frame"), and frames in which video signals preceding to each of the current frame and the delay frame are delayed by the horizontal line units (hereinafter, called as "line delay frames").

Figure 1:
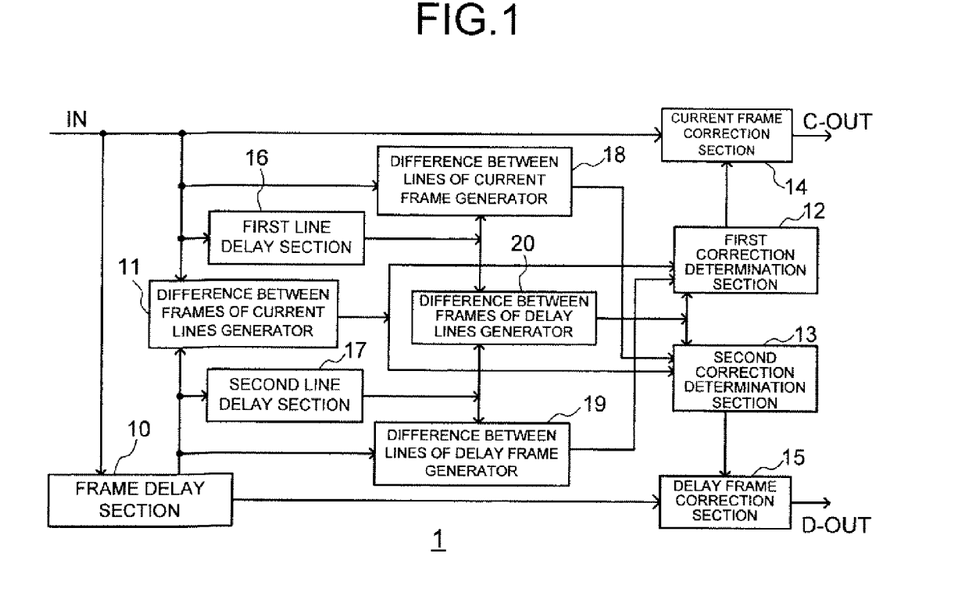
FIG. 1 is a block diagram showing a functional configuration of a noise reduction device according to an embodiment of the present invention.
Figure 2:
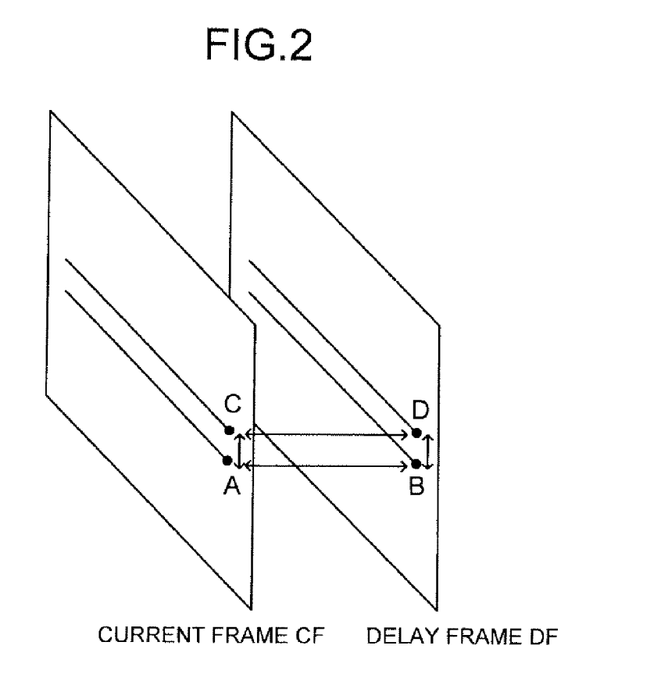
FIG. 2 is a view explaining an arithmetic process of the embodiment shown in FIG. 1.

Hereinafter, a noise reduction device according to an embodiment of the present invention is described in detail with reference to the drawings. FIG. 1 is a block diagram showing a functional configuration of the noise reduction device according to the embodiment of the present invention, and FIG. 2 is a view explaining as for an arithmetic process of the noise reduction device according to the embodiment.

As shown in FIG. 1, a noise reduction device 1 of this embodiment includes a frame delay section 10 (a frame delay module), a difference between frames of current lines generator 11 (a first difference generate module), a first correction determination section 12 a second correction determination section 13, a current frame correction section 14 (a first correction module), a delay frame correction section 15 (a second correction module), a first line delay section 16 (a first line delay module), a second line delay section 17 (a second line delay module), a difference between lines of current frame generator 18 (a second difference generate module), a difference between lines of delay frame generator 19 (a third difference generate module), and a difference between frames of delay lines generator 20 (a fourth difference generate module).

The frame delay section 10 is a delay element delaying a video signal (frame) inputted from an input IN for one frame. Namely, the frame delay section 10 generates a delay frame by delaying a frame which is preceding to a current frame for one frame, for one frame. FIG. 2 shows a relation between a current frame CF and a delay frame DF (a frame preceding to the current frame for one frame). In FIG. 2, the frame delay section 10 operates to generate the delay frame DF.

The difference between frames of current lines generator 11 is an arithmetic unit calculating a difference between the current frame and the delay frame. Namely, the difference between frames of current lines generator 11 operates to extract a video with motion or a noise component by a frame unit. In FIG. 2, the difference between frames of current lines generator 11 generates a difference value between a line A and a line B.

The first and second correction determination sections 12, 13 are arithmetic units having functions determining whether a noise removal (correction of video information) is to be performed or not as for each of the current frame and the delay frame, and outputting a correction signal when it is determined that the noise removal is to be performed. The first and second correction determination sections 12, 13 determine whether there is a motion in the current line or a noise component, based on difference information between a current line and a delay line in which a line preceding to the current line for one line is delayed for one line (hereinafter, called as the "delay line") within a later-described current frame, difference information between a current line and a delay line within a delay frame, and difference information between the delay lines of each of the current frame and the delay frame. When it is determined to be the noise component as a result of the determination, the first and second correction determination sections 12, 13 output an output signal of the difference between frames of current lines generator 11 as correction signals. The current frame correction section 14 and the delay frame correction section 15 are arithmetic units performing corrections of each of the current frame and the delay frame by using the correction signals outputted by the first and second correction determination sections 12, 13.

The first and second line delay sections 16, 17 are arithmetic elements delaying a frame by one horizontal line unit. Namely, the first and second line delay sections 16, 17 output a first line delay frame and a second line delay frame in which the video signals preceding to each of the current frame and the delay frame for one horizontal line are delayed for one horizontal line. In FIG. 2, the first line delay section 16 generates a line C, and the second line delay section 17 generates a line D.

The difference between lines of current frame generator 18 is an arithmetic unit generating a difference value between the current frame and the first line delay frame. In FIG. 2, the difference between lines of current frame generator 18 generates the difference value between a line A and a line C. The difference between lines of delay frame generator 19 is an arithmetic unit generating a difference value between the delay frame and the second line delay frame. In FIG. 2, the difference between lines of delay frame generator 19 generates the difference value between a line B and a line D. The difference between frames of delay lines generator 20 is an arithmetic unit generating a difference value between the first line delay frame and the second line delay frame. In FIG. 2, the difference between frames of delay lines generator 20 generates the difference value between a line C and a line D.

The current frame inputted to the input IN is inputted to the current frame correction section 14, the difference between frames of current lines generator 11, the first line delay section 16, the difference between lines of current frame generator 18, and the frame delay section 10. On the other hand, the frame delay section 10 gives the delay frame in which a frame preceding to the current frame for one frame is delayed for one frame to the difference between frames of current lines generator 11, the second line delay section 17, the difference between lines of delay frame generator 19, and the delay frame correction section 15. The difference between frames of current lines generator 11 generates a difference value between the current frame and the delay frame, and gives it to the first and second correction determination sections 12, 13.

The first and second line delay sections 16, 17 output the first line delay frame and the second line delay frame in which the video signals respectively preceding to the current frame and the delay frame for one horizontal line are delayed for one horizontal line. The difference between lines of current frame generator 18 generates the difference value between the current frame and the first line delay frame and gives it to the second correction determination section 13. The difference between lines of delay frame generator 19 generates the difference value between the delay frame and the second line delay frame and gives it to the first correction determination section 12. The difference between frames of delay lines generator 20 generates the difference value between the first and second line delay frames and gives it to the first and second correction determination sections 12, 13. As a result, the first correction determination section 12 receives a difference signal between the current frame and the delay frame being a correction value, a difference value between lines within the delay frame as information to determine whether the correction is to be performed or not, and a difference value between the delay lines of each of the current frame and the delay frame. Similarly, the second correction determination section 13 receives a difference signal between the current frame and the delay frame being a correction value, a difference value between lines within the current frame as information to determine whether the correction is to be performed or not, and a difference value between the delay lines of each of the current frame and the delay frame.

Namely, the first correction determination section 12 uses the difference value between the line B and the line D and the difference value between the line C and the line D for a correction determination of the current line A shown in FIG. 2. Besides, the second correction determination section 13 uses the difference value between the line A and the line C and the difference value between the line C and the line D for a correction determination of the delay line B shown in FIG. 2. The correction determination is performed by determining that it is the noise component when either one of or both of the two difference values (a logical sum or a logical product) is/are over a predetermined threshold value. The first and second correction determination sections 12, 13 respectively determine whether the current line being the object to be processed is the motion or the noise based on the information to determine whether the correction is to be performed or not. The difference values being the correction values are respectively given to the current frame correction section 14 and the delay frame correction section 15 when it is determined to be the noise. The current frame correction section 14 and the delay frame correction section 15 add/subtract the given correction values and output to outputs C-OUT, D-OUT.

As stated above, according to the noise reduction device of this embodiment, the determination between the video motion and the noise component is performed not by a combination of a motion detecting circuit and an integrator but based on the mutual difference data between the current frame and the delay frame, and between the current line and the delay line. Accordingly, it is possible to realize an effective noise component removal without a blurring of video even if it is the video information in high resolution.

Figure 3:
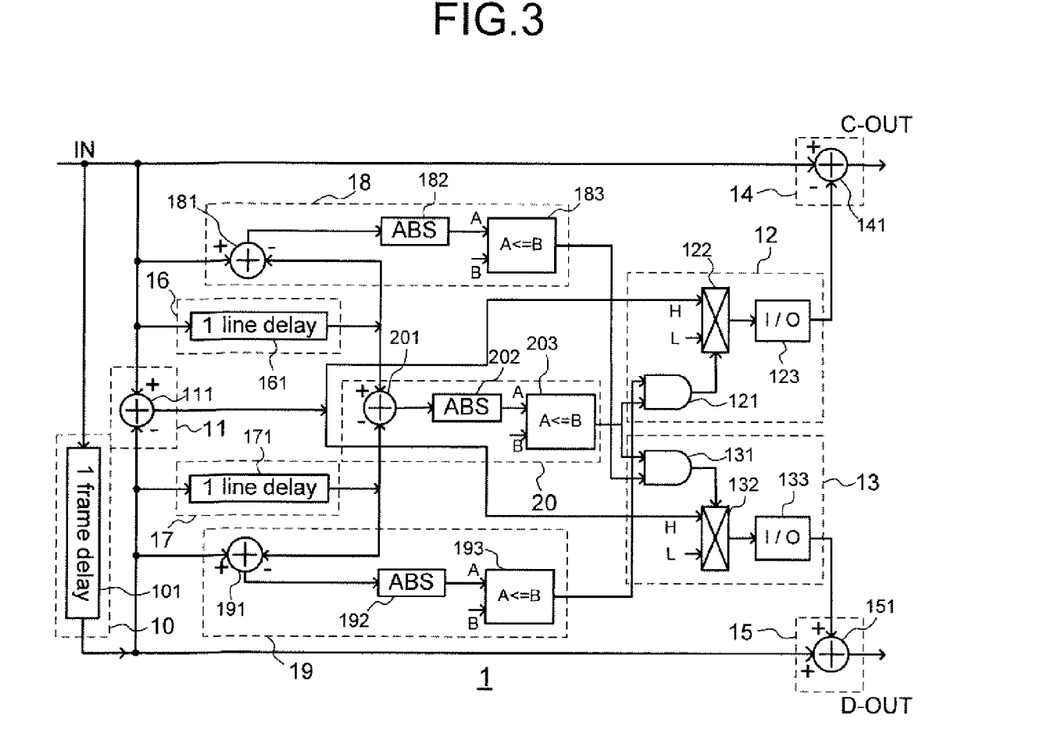
FIG. 3 is a view showing a configuration of the embodiment shown in FIG. 1.

Subsequently, a configuration example of the noise reduction device of this embodiment is more specifically described with reference to FIG. 3 to FIG. 5. FIG. 3 is a view showing a configuration of the noise reduction device of this embodiment, FIG. 4 is a view explaining an operation of a limiter conversion circuit of this embodiment, and FIG. 5 is a view showing signal waveform examples at respective elements constituting the noise reduction device of this embodiment.

As shown in FIG. 3, the frame delay section 10 of this embodiment is realized by a one-frame delay element 101. The difference between frames of current lines generator 11 is realized by an adder 111. The first and second line delay sections 16, 17 are respectively realized by common one-horizontal-line delay elements 161, 171. The current frame correction section 14 and the delay frame correction section 15 are respectively realized by common adders 141, 151.

The first correction determination section 12 includes an AND circuit 121 (hereinafter, called as "AND 121"), a switching circuit 122, and a limiter conversion circuit 123. The AND circuit 121 is a logic circuit outputting an AND logical value of the difference value transmitted from the difference between lines of delay frame generator 19 and the difference value transmitted from the difference between frames of delay lines generator 20. Namely, the AND circuit 121 outputs "1" when both the difference value between lines within the delay frame and the difference value between frames of the delay lines are outputted (when both of the difference values are "1"). The switching circuit 122 is a switch switching the output of the difference between frames of current lines generator 11 and a zero potential (a logical value of "0" (zero)), and outputs either one of them in accordance with the output of the AND 121. In an example shown in FIG. 3, an input "H" is selected and outputted when the output of the AND 121 is "1." The limiter conversion circuit 123 is a signal conversion circuit performing a predetermined conversion to an inputted signal and outputting it.

Figure 4:
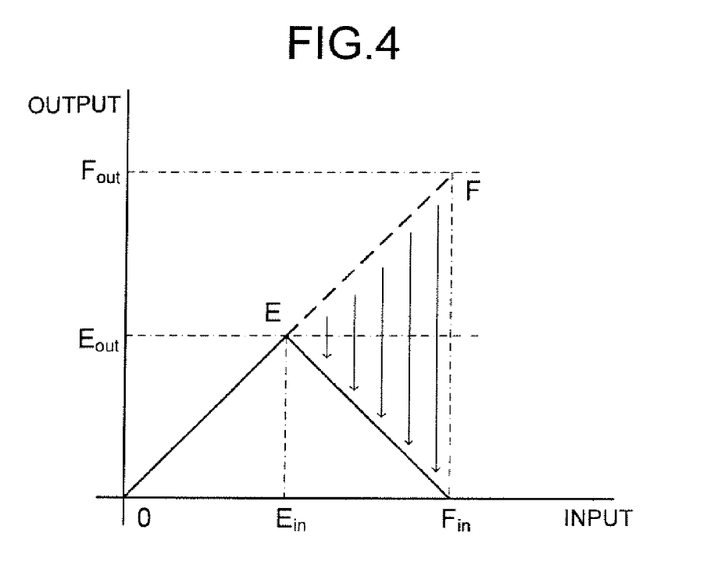
FIG. 4 is a view explaining an operation of a limiter conversion circuit of the embodiment shown in FIG. 1.
Figure 5:
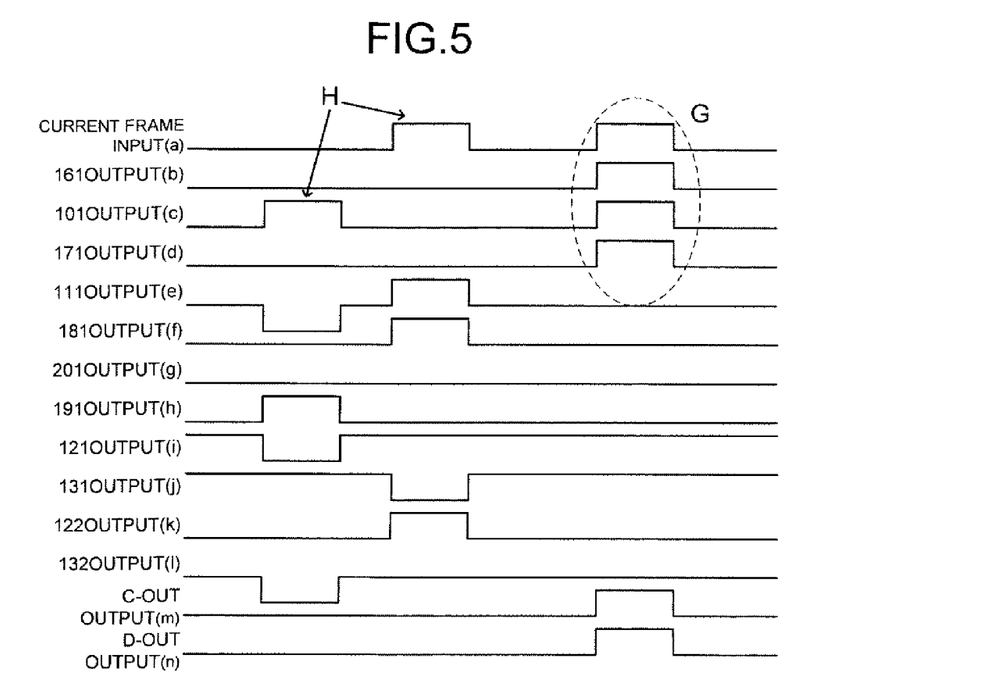
FIG. 5 is a view showing signal waveform examples of respective elements of the embodiment shown in FIG. 1.

In the signal conversion of the limiter conversion circuit 123, inputs from "0" (zero) to $E_{in}$ are converted linearly to outputs from "0" (zero) to $E_{out}$, and the inputs from $E_{in}$ to $F_{in}$ are converted inverse-linearly to the outputs from $E_{out}$ to "0" (zero), as shown in FIG. 4. Namely, it is constituted such that an output characteristic is inversely folded from $E_{out}$ being an approximately intermediate point between "0" (zero) and $F_{out}$ (such that the outputs from a point E to a point F are folded from the point E to the point $F_{in}$). The point E ($E_{in}$) is a value in a size (the number of bits) of which frequency of appearance is the highest as the noise within the video signal, and it can be obtained from a histogram and so on. As an example of $E_{in}$, it is possible to make it to be, for example, a value of 3 LSB (corresponding to three of Least Significant Bits). Namely, the limiter conversion circuit 123 operates to bring about the highest noise correction effect to the noise in the size of which frequency of appearance is the highest (3 LSBs in this case).

As shown in FIG. 3, the switch circuit 122 outputs the output of the difference between frames of current lines generator 11 as it is when there is the output of the difference between frames of current lines generator 11 (there is the difference value between the current frame and the delay frame (=information seems to be noise)), and both the difference value between lines within the delay frame and the difference value between frames of the delay lines are outputted (when the AND output is "1"). The output of the switch circuit 122 is level converted by the limiter conversion circuit 123, and is given to the current frame correction section 14 as the correction value.

Incidentally, the second correction determination section 13 corresponds to the first correction determination section 12, and includes an AND 131, a switch circuit 132, and a limiter conversion circuit 133. Namely, the second correction determination section 13 has a common configuration with the first correction determination section 12. The switch circuit 132 outputs the output of the difference between frames of current lines generator 11 as it is when there is the output of the difference between frames of current lines generator 11 (=information seems to be the noise), and both the difference value between lines within the current frame and the difference value between frames of the delay lines are outputted. The output of the switch circuit 132 is level converted by the limiter conversion circuit 133, and is given to the delay frame correction section 15 as the correction value.

As shown in FIG. 3, the difference between lines of current frame generator 18 has an adder 181, an absolute value converter 182 (hereinafter, called as "ABS 182"), and a comparator 183. The adder 181 adds the current frame and the delay line of the current frame of which sign is reversed. The ABS 182 is a converter outputting an absolute value of an input signal. The comparator 183 is an arithmetic unit outputting "1" when inputs A and B are compared and a relation of "A<=B" is satisfied. Namely, the comparator 183 operates as a limiter outputting "1" when the value of the input A is not more than that of the input B.

The adder 181 generates a difference value between the current frame and the first line delay frame, and the ABS 182 outputs an absolute value of the difference value. A predetermined threshold value is given to the input B of the comparator 183, and the comparator 183 outputs "1" when the output of the ABS 182 is not more than the threshold value. Namely, the difference between lines of current frame generator 18 functions to output "1" when there is the information seems to be the noise with a small absolute value in the current frame.

The difference between lines of delay frame generator 19 corresponds to the difference between lines of current frame generator 18, and has an adder 191, an ABS 192, and a comparator 193. Namely, the difference between lines of delay frame generator 19 has a common configuration with the difference between lines of current frame generator 18. The adder 191 generates a difference value between the delay frame and the second line delay frame, and the ABS 192 outputs an absolute value of the difference value. A predetermined threshold value is given to the input B of the comparator 193, and the comparator 193 outputs "1" when the output of the ABS 192 is not more than the threshold value. The difference between lines of delay frame generator 19 functions to output "1" when there is the information seems to be the noise with a small absolute value in the delay frame.

As shown in FIG. 3, the difference between frames of delay lines generator 20 corresponds to the difference between lines of current frame generator 18 and the difference between lines of delay frame generator 19, and has an adder 201, an ABS 202, and a comparator 203. Namely, the difference between frames of delay lines generator 20 has a common configuration with the difference between lines of current frame generator 18 and the difference between lines of delay frame generator 19. The adder 201 generates a difference value between the first and second line delay frames, and the ABS 202 outputs an absolute value of the difference value. A predetermined threshold value is given to the input B of the comparator 203, and the comparator 203 outputs "1" when the output of the ABS 202 is not more than the threshold value. The difference between current frame lines generator 20 functions to output "1" when there is the information seems to be the noise with a small absolute value in the delay line.

As stated above, each of the difference between lines of current frame generator 18, the difference between lines of delay frame generator 19, and the difference between frames of delay lines generator 20 outputs "1" when it is judged that the difference is small and the motion is a little. The first and second correction determination sections 12, 13 give the output of the difference between frames of current lines generator 11 to the adders 141, 151 as the correction value, from a combination of these "1" or "0" (zero) (when the combination is "AND" in this example), to respectively let subtracting/adding processes perform. Accordingly, the removal of the noise component is performed as for the current frame and the delay frame.

Here, an operation of the noise reduction circuit of this embodiment is described in detail with reference to FIG. 3 and FIG. 5. It is assumed that a line signal shown by (a) in FIG. 5 is inputted to the input IN, and a line signal similarly shown by (b) is outputted at an output of the one horizontal line delay element 161. Similarly, it is assumed that a line signal shown by (c) is outputted at an output of the one frame delay element 101, and a line signal similarly shown by (d) is outputted at an output of the one horizontal line delay element 171. Accordingly, a possibility that it is a video signal showing a picture is high because pulses shown by "G" in the drawing commonly appear at the current frame, the delay frame, and the respective delay lines. On the other hand, a possibility that it is a picture with motion or a noise component is high because appearance positions of pulses shown by "H" in the drawing are different by each of the current frame, the delay frame, and the respective delay lines.

The adder 111 outputs the difference between the current frame and the delay frame, and therefore, it outputs (e) being a difference between (a) and (c). On the other hand, the adder 181, the adder 201, and the adder 191 respectively output the difference value between the current frame and the first line delay frame, the difference value between the delay line of the current frame and the delay line of the delay frame, and the difference value between the delay frame and the second line delay frame, and therefore, they respectively output signals of (f), (g), and (h). Namely, the pulses estimated to be pictures are cancelled by a difference process, and only pulses estimated to be the noise component remain in (f), (g), and (h). Finally, the adders 141, 151 add/subtract (k), (l) being the outputs of the switch circuits 122, 132 to each of the current frame and the delay frame as the correction signals of the noise removal, and output a current frame (m) and a delay frame (n) in which the noise components are removed.

As stated above, in the noise reduction device of this embodiment, it is constituted such that a signal in a size in which many noise components appear is relatively corrected largely by including the limiter conversion circuit, and therefore, it is possible to effectively remove the noise component particularly unique to the digital video. Besides, in the noise reduction device of this embodiment, the correction process is performed while the difference value between the current lines of each of the current frame and the delay frame is used as a correction signal based on the difference value between the current line and the delay line within the current frame, the difference value between the current line and the delay line within the delay frame, and the difference value between the delay lines of each of the current frame and the delay frame. Accordingly, it is possible to effectively remove the noise component unique to digital while suppressing the error caused by the motion of the picture.

Figure 6:
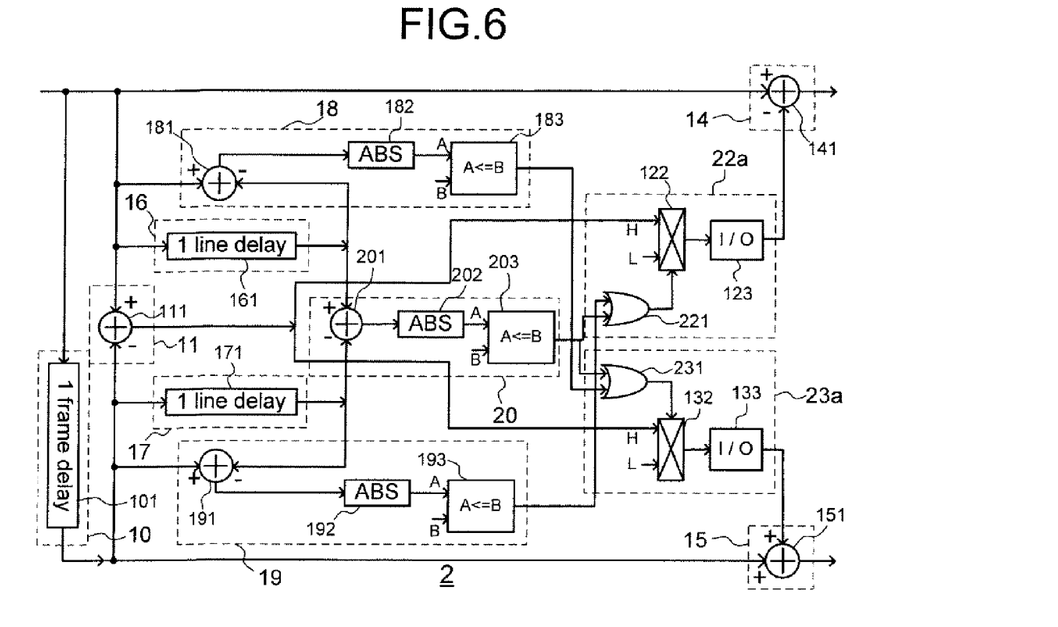
FIG. 6 is a view showing a configuration of a noise reduction device according to another embodiment of the present invention.

Next, a noise reduction device according to another embodiment is described in detail with reference to FIG. 6. FIG. 6 is a view showing a circuitry of the noise reduction device according to this embodiment. In the following description, common elements with the embodiment shown in FIG. 1 to FIG. 5 are represented by showing common reference numerals, and redundant description thereof will not be given.

A noise reduction device 2 shown in FIG. 6 is the one in which the ANDs 121, 131 of the noise reduction device 1 shown in FIG. 3 are replaced by OR circuits 221, 231. Namely, in the embodiment shown in FIG. 3, the correction process of the noise component is performed when the difference value between the current frame and the first line delay frame and the difference value between the delay lines of each of the current frame and the delay frame, and the difference value between the delay frame and the second line delay frame and the difference value between the delay lines of each of the current frame and the delay frame respectively satisfy AND (when respective outputs exist). In the embodiment shown in FIG. 6, the correction process of the noise component is performed when the difference value between the current frame and the first line delay frame and the difference value between the delay lines of each of the current frame and the delay frame, and the difference value between the delay frame and the second line delay frame and the difference value between the delay lines of each of the current frame and the delay frame respectively satisfy OR (when at least one of the outputs exists respectively). Consequently, the correction process of the noise component is easier to be performed in the embodiment shown in FIG. 6, and on the contrary, the detection of the motion can be eased. It means that this is suitable for the process of the video signal with a lot of noise components.

Figure 7:
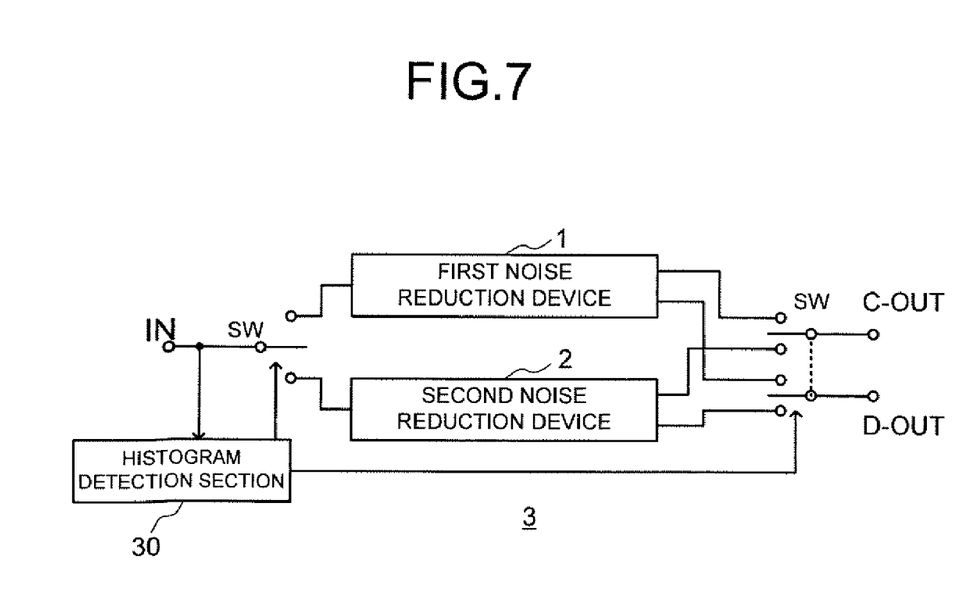
FIG. 7 is a block diagram showing a functional configuration of a noise reduction device according to still another embodiment of the present invention.

Subsequently, a noise reduction device according to another embodiment is described in detail with reference to FIG. 7. FIG. 7 is a block diagram showing a configuration of the noise reduction device according to the embodiment. In the following description, common elements with the embodiments shown in FIG. 1 to FIG. 6 are represented by showing common reference numerals, and redundant description thereof will not be given. A noise reduction device 3 of this embodiment has the noise reduction device 1 shown in FIG. 3, the noise reduction device 2 shown in FIG. 6, a histogram detection section 30 detecting a histogram of an inputted video signal, and a switch SW switching the noise reduction devices 1 and 2.

The histogram detection section 30 has functions to detect the histogram of a whole of the inputted video signal (whole screen), and to control such that either one of the noise reduction devices 1 or 2 is to be connected to the input IN in accordance with a detection result. More specifically, the histogram detection section 30 controls the switch SW such that an input video signal is inputted to the second noise reduction device 2 when the number of pixels near to a black level or a ratio of the number of pixels occupying in the whole screen in the input video signal is higher than a predetermined threshold value. A table showing histogram characteristics and which one of the noise reductions is to be used is stored in a memory and soon in advance, and thereby, the comparison with the threshold value can be judged by referring to the table. As stated above, the correction process of the noise component is easier to be performed in the second noise reduction device 2 than the first noise reduction device 1, and therefore, a more effective noise component removal can be realized.

It should be noted that the present invention is not limited to the above-described embodiments as they are, and in an implementation stage, it can be embodied by modifying components thereof within a range not departing from the spirit of the invention. For example, the noise reduction device 3 of the embodiment shown in FIG. 7 is constituted such that plural noise reduction devices having different noise reduction effects are switched to be connected in accordance with the detection result of the histogram, but it is not limited to the above. The histogram detection section is added to the single noise reduction device of the embodiment shown in FIG. 3 or FIG. 6, and the comparative values B of the comparators 183, 193, 203 may be controlled, or limiter characteristics (the point E in FIG. 3) of the limiter conversion circuits 123, 133 may be controlled, in accordance with the detection result. Also, the plural components disclosed in the above-described embodiments can be appropriately combined to form various inventions. For example, some of all the components shown in the embodiments may be eliminated. Moreover, components from different embodiments may be combined appropriately.

According to the embodiments of the present invention, noise reduction effect suppressing a tailing phenomenon can be obtained in video information in high resolution. The present invention can be applied to a video processing device.

What is claimed is:

1. A noise reduction device, comprising:
   a frame delay module to generate a delay frame by delaying an input frame of a video signal in each frame;
   a first difference generate module to generate a first difference value between the delay frame and the input frame;
   a first line delay module to generate a first line delay frame by delaying the input frame in each line;
   a second line delay module to generate a second line delay frame by delaying the delay frame in each line;
   a second difference generate module to generate a second difference value between the input frame and the first line delay frame;
   a third difference generate module to generate a third difference value between the delay frame and the second line delay frame;
   a fourth difference generate module to generate a fourth difference value between the first line delay frame and the second line delay frame;
   a first correction module to correct the input frame by using the first difference value based on a logical sum or a logical product of the third difference value and the fourth difference value; and
   a second correction module to correct the delay frame by using the first difference value based on a logical sum or a logical product of the second difference value and the fourth difference value.

2. The noise reduction device of claim 1, wherein the second difference generate module includes a first limiter module to output the second difference value when an absolute value of the second difference value is not more than a predetermined value;
   the third difference generate module includes a second limiter module to output the third difference value when an absolute value of the third difference value is not more than a predetermined value; and
   the fourth difference generate module includes a third limiter module to output the fourth difference value when an absolute value of the fourth difference value is not more than a predetermined value.

3. The noise reduction device of claim 1, wherein the first correction module includes a first conversion module to convert the first difference value into a subtracted value by subtracting a difference value between the first difference value and a predetermined threshold value from the threshold value, when the first difference value exceeds the threshold value; and
   the second correction module includes a second conversion module to convert the second difference value into a subtracted value by subtracting a difference value between the second difference value and the threshold value from the threshold value, when the second difference value exceeds the threshold value.

4. A noise reduction device, comprising:
   a first noise reduction module including:
      a first frame delay module to generate a first delay frame by delaying an input frame of a video signal in each frame;
      a first difference generate module to generate a first difference value between the first delay frame and the input frame;
      a first line delay module to generate a first line delay frame by delaying the input frame in each line;
      a second line delay module to generate a second line delay frame by delaying the first delay frame in each line;
      a second difference generate module to generate a second difference value between the input frame and the first line delay frame;
      a third difference generate module to generate a third difference value between the first delay frame and the second line delay frame;
      a fourth difference generate module to generate a fourth difference value between the first line delay frame and the second line delay frame;
      a first correction module to correct the input frame by using the first difference value based on a logical sum of the third difference value and the fourth difference value; and
      a second correction module to correct the first delay frame by using the first difference value based on a logical sum of the second difference value and the fourth difference value;
   a second noise reduction module including:
      a second frame delay module to generate a second delay frame by delaying an input frame of a video signal in each frame;
      a fifth difference generate module to generate a fifth difference value between the second delay frame and the input frame;
      a third line delay module to generate a third line delay frame by delaying the input frame in each line;
      a fourth line delay module to generate a fourth line delay frame by delaying the second delay frame in each line;
      a sixth difference generate module to generate a sixth difference value between the input frame and the third line delay frame;
      a seventh difference generate module to generate a seventh difference value between the second delay frame and the fourth line delay frame;
      an eighth difference generate module to generate an eighth difference value between the third line delay frame and the fourth line delay frame;
      a third correction module to correct the input frame by using the fifth difference value based on a logical product of the sixth difference value and the eighth difference value; and
      a fourth correction module to correct the second delay frame by using the fifth difference value based on a logical product of the seventh difference value and the eighth difference value;
   a switching module to input a frame of an input video signal to either one of the first noise reduction module or the second noise reduction module as the input frame of the video signal;
   a histogram detection module to detect a histogram of the input video signal;
   a memory to store a table defying histogram characteristics and a noise reduction module to be selected between the first and second noise reduction modules; and
   a control module to control the switching module based on a detection result of the histogram detection module and the table stored in the memory.

5. A noise reduction method, comprising:

generating a delay frame by delaying an input frame of a video signal in each frame;

generating a first difference value between the delay frame and the input frame;

generating a first line delay frame by delaying the input frame in each line;

generating a second line delay frame by delaying the delay frame in each line;

generating a second difference value between the input frame and the first line delay frame;

generating a third difference value between the delay frame and the second line delay frame;

generating a fourth difference value between the first line delay frame and the second line delay frame;

correcting the input frame by using the first difference value based on a logical sum or a logical product of the third difference value and the fourth difference value; and correcting the delay frame by using the first difference value based on a logical sum or a logical product of the second difference value and the fourth difference value.

* * * * *